(12) United States Patent
George et al.

(10) Patent No.: US 12,371,185 B2
(45) Date of Patent: Jul. 29, 2025

(54) VEHICLE OPERATOR MONITORING SYSTEM WITH SMART ACTIVE ENGAGEMENT AND DISENGAGEMENT

(71) Applicant: Rockwell Collins, Inc., Cedar Rapids, IA (US)

(72) Inventors: Christopher L George, Winchester, VA (US); Arjun Harsha Rao, Marion, IA (US); Timothy J. Wittkop, Marion, IA (US); Wade T. Johnson, Cedar Rapids, IA (US); Peggy Wu, Ellicott City, MD (US); Michael P. Matessa, Ben Lomond, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/734,710

(22) Filed: May 2, 2022

(65) Prior Publication Data

US 2022/0388677 A1    Dec. 8, 2022

Related U.S. Application Data

(60) Provisional application No. 63/196,854, filed on Jun. 4, 2021.

(51) Int. Cl.
*B64D 45/00* (2006.01)
*B64D 43/00* (2006.01)
*G08G 5/21* (2025.01)

(52) U.S. Cl.
CPC ............. *B64D 45/00* (2013.01); *B64D 43/00* (2013.01); *G08G 5/21* (2025.01)

(58) Field of Classification Search
CPC ..................................................... B64D 45/00
See application file for complete search history.

(56) References Cited

U.S. PATENT DOCUMENTS

| 6,658,572 | B1 | 12/2003 | Craig |
| 8,874,301 | B1 | 10/2014 | Rao et al. |
| 9,823,656 | B1 * | 11/2017 | Dsouza ................ G08G 5/0056 |

(Continued)

FOREIGN PATENT DOCUMENTS

EP    3556657 A1    10/2019

OTHER PUBLICATIONS

Extended European Search Report dated Nov. 15, 2022, European Application No. 22176964.9 filed Jun. 2, 2022.

*Primary Examiner* — Joseph H Feild
*Assistant Examiner* — Pameshanand Mahase
(74) *Attorney, Agent, or Firm* — Suiter Swantz IP (57) ABSTRACT

An operator safety system (OSS) monitors the physiological well-being of an aircraft pilot or vehicle operator, and has engaged and disengaged operational states (the engaged state associated with active monitoring). The OSS includes a smart engage/disengage system incorporating presence sensors (e.g., visual, seat-based) installed in the cockpit or control area of the vehicle. When the presence sensors determine that the pilot/operator is no longer present in their seat but the OSS is still engaged, the OSS prompts the operator to disengage the OSS (e.g., via single-touch display interface or remotely to a mobile device). When the presence sensors determine that the operator is present or seated, but the OSS is disengaged, the OSS prompts the operator to re-engage the OSS.

20 Claims, 5 Drawing Sheets

(56) References Cited

U.S. PATENT DOCUMENTS

| | | | |
|---|---|---|---|
| 10,773,591 B2* | 9/2020 | Yeomans | G05D 1/0088 |
| 11,001,145 B2 | 5/2021 | Trabucco | |
| 11,104,352 B2* | 8/2021 | Jones | G05D 1/0088 |
| 2008/0036581 A1* | 2/2008 | Bunims | B60R 22/48 |
| | | | 280/801.1 |
| 2010/0222976 A1 | 9/2010 | Haug | |
| 2012/0307066 A1* | 12/2012 | De Ieso | G08B 13/19602 |
| | | | 348/E5.09 |
| 2013/0061044 A1* | 3/2013 | Pinkus | G07C 5/08 |
| | | | 713/160 |
| 2013/0253756 A1* | 9/2013 | Matsuno | B60W 50/082 |
| | | | 701/29.2 |
| 2016/0231855 A1* | 8/2016 | Bendewald | B60K 35/81 |
| 2018/0072325 A1 | 3/2018 | Koike | |
| 2018/0218607 A1* | 8/2018 | Baghel | G08G 1/162 |
| 2019/0090800 A1* | 3/2019 | Bosworth | A61B 5/0015 |
| 2019/0369615 A1* | 12/2019 | Martinez Jara | B64D 43/00 |

* cited by examiner

VEHICLE OPERATOR MONITORING SYSTEM WITH SMART ACTIVE ENGAGEMENT AND DISENGAGEMENT

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/196,854 filed Jun. 4, 2021 and entitled PILOT SAFETY SYSTEM WITH AUTOMATIC ENGAGEMENT/DISENGAGEMENT.

Said U.S. Provisional Patent Application Ser. No. 63/196,854 is herein incorporated by reference in its entirety.

BACKGROUND

Modern cockpits may be equipped with physiological monitoring systems capable of tracking various health or well-being related states of a pilot or co-pilot; e.g., fatigue/alertness, heart rate, oxygenation, G-force strain. Such physiological monitors can be very valuable for tracking pilot capability inflight, but they may also introduce extra workload and procedures that must be incorporated into the pilot's routine. For example, when the pilot leaves their seat (or, e.g., the cockpit), the monitoring system must be disengaged lest the system conclude from any associated changes in state that an event has occurred requiring emergency intervention. Similarly, when the pilot returns to their seat the monitoring system must be re-engaged.

SUMMARY

In a first aspect, an operator safety system (OSS) for monitoring the well-being of a vehicle operator or pilot in a cockpit of control area of the vehicle is disclosed. In embodiments, the OSS includes presence sensors within the control area for assessing whether or not the operator is currently present, e.g., seated in the appropriate pilot or co-pilot seat. An operator interface includes a display surface viewable by the operator and an input device for accepting control input. The OSS may be either engaged (e.g., actively monitoring the operator or pilot) or disengaged; the operator interface allows the operator to either engage or disengage the device (e.g., when the operator enters or leaves the pilot/co-pilot seat). When the presence sensors determine that the operator is no longer present (e.g., having left the pilot seat or the cockpit) but the OSS is still in an engaged state, the OSS prompts the operator to disengage the OSS via the interface. Similarly, when the presence sensors determine that the operator is present but the OSS is disengaged, the OSS prompts the operator to re-engage the OSS.

In some embodiments, the display surface and the input device are combined in an interactive touchscreen, such that the operator can engage or disengage the OSS via a single-touch interaction (e.g., when prompted to do so).

In some embodiments, the presence sensors include cameras or other like image sensors oriented toward the pilot/co-pilot seat.

In some embodiments, the cameras are configured for thermal imaging (e.g., in the infrared band) of the pilot seat and/or cockpit. For example, the OSS determines a heat level of the pilot seat/control area and determines the presence or non-presence of the operator based on the detected heat.

In some embodiments, the OSS determines, based on a detected residual heat level, approximately how long the operator has been absent from the pilot seat.

In some embodiments, the cameras detect encoded fiducial markers in the pilot seat or cockpit, and determines the presence or non-presence of the operator based on whether the fiducial markers can be detected and decoded (e.g., as the presence of the operator may obstruct some or all fiducial markers).

In some embodiments, the vehicle is an aircraft, the operator is a pilot or co-pilot (seated in a pilot seat or co-pilot seat respectively), and the presence sensors determine whether or not the pilot/co-pilot is seated in the appropriate seat.

In some embodiments, the presence sensors are embedded within the pilot/co-pilot seat, and the OSS determines the presence or non-presence of the operator based on pressure and/or temperature (e.g., body heat) detected within the pilot/co-pilot seat.

In some embodiments, the presence sensors are located within, or connected to, a safety belt or safety harness securing the operator to the pilot/co-pilot seat, The safety belt or harness may be fastened or unfastened, the fastened or unfastened state detectable by the presence sensors to indicate operator presence or non-presence.

In some embodiments, e.g., if the operator is not present either in the pilot seat or within the control area/cockpit, the OSS prompts the operator to disengage remotely, e.g., via a mobile device carried by the operator, and via which the operator can remotely disengage the OSS.

In some embodiments, the OSS is connected to a flight management system (FMS) or other like vehicle control system, and assesses the presence or non-presence of the operator in response to a demand issued by the FMS, e.g., based on a triggering event.

In some embodiments, the presence sensors include at least two independent sensors (or banks/groups thereof) that independently register a determination of operator presence or non-presence. The OSS will determine the ultimate presence or non-presence of the operator based on a majority of registered decisions from the independent sensors.

In some embodiments, the OSS assigns a weight to each independent sensor or bank thereof, and determines the presence or non-presence of the operator based on a weighted majority of registered decisions from the independent sensors.

In a further aspect, a method for smart monitoring of a vehicle operator is also disclosed. In embodiments, the method includes determining a current operational status (engaged or disengaged) of a vehicle-based operator safety system (OSS) for monitoring physiological parameters of an operator of the vehicle. The method includes determining, via presence sensors in communication with the OSS, whether the operator is currently present or not present in a control area of the vehicle. The method includes, based on the determined presence or non-presence of the operator and the engaged or disengaged status of the OSS, prompting the operator to adjust the operational status of the OSS. For example, the vehicle may be an aircraft of which the operator is a pilot or co-pilot, and the method includes assessing whether or not the operator is currently seated in the appropriate pilot or co-pilot seat within the cockpit.

In some embodiments, the method includes, when the OSS is engaged but the operator is not present, prompting the operator (remotely if necessary) to disengage the OSS.

In some embodiments, the method includes, when the OSS is disengaged but the operator is present, prompting the operator to engage (or re-engage) the OSS.

In some embodiments, the method includes independently assessing the presence or non-presence of the operator via at least two independent sensors or banks/groups thereof, and determining the presence or non-presence of the operator based on a majority of independently registered determinations or presence or non-presence.

In some embodiments, the method includes assigning, via the OSS, a weight to each independent presence sensor or bank thereof, and determining the presence or non-presence of the operator based on a weighted majority of determinations of presence or non-presence independently registered by the sensors.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
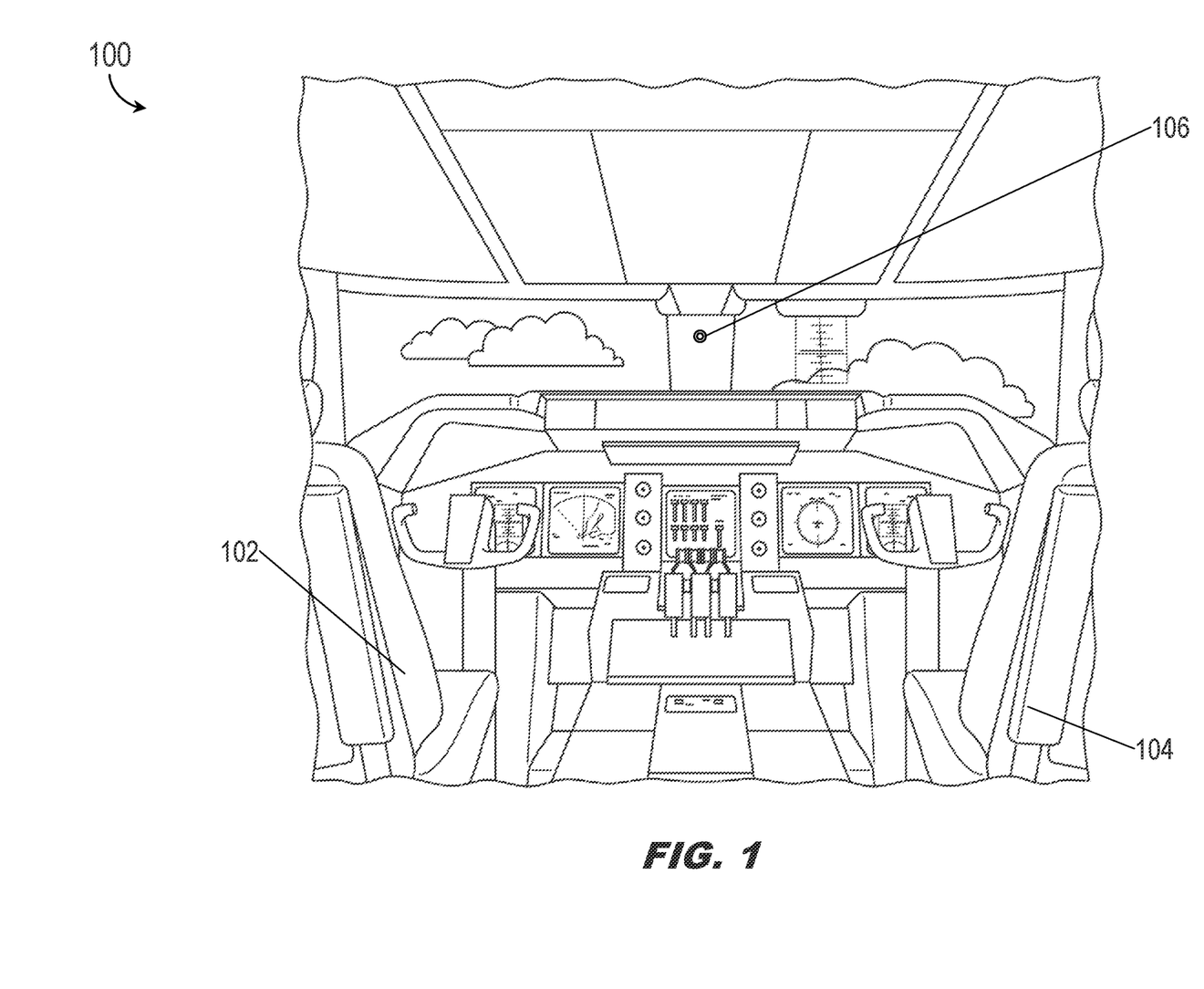
FIG. 1 is a control area of a vehicle according to example embodiments of this disclosure.

Referring to FIG. 1, a control space 100 of a vehicle is shown. The control space 100 may include pilot seat 102, co-pilot seat 104, and presence sensor 106.

In embodiments, the vehicle may include an aircraft, of which the control space 100 is a cockpit configured to accommodate a pilot and co-pilot respectively the pilot seat 102 and the co-pilot seat 104. The control space 100 may include an operator safety system (OSS), e.g., a pilot monitoring system for assessing the physiological well-being of the pilot and/or co-pilot inflight. For example, the OSS may continually assess heart rate, breathing, eye movement, blood flow or oxygenation, and other vital statistics to anticipate or avoid unexplained physiological events (UPE) such as hypoxia, hypercapnia (excessive levels of $CO_2$ in the blood), G-force strain, or other like symptoms indicative of potential pilot fatigue or impairment.

In embodiments, the OSS may require the pilot or co-pilot manually disengage the system when leaving the pilot seat 102 or co-pilot seat 104. For example, the pilot may temporarily leave the control space 100, designating the co-pilot as the pilot flying. Should the pilot or co-pilot fail to manually disengage the OSS, the resulting changes in state associated with the pilot or co-pilot's absence may be interpreted by the OSS as an emergency requiring intervention. Similarly, should the pilot or co-pilot return to their respective seat without manually re-engaging the OSS, the data detected and reported by the OSS may be compromised; further, a disengaged OSS may fail to detect subsequent pilot well-being issues.

Figure 2:
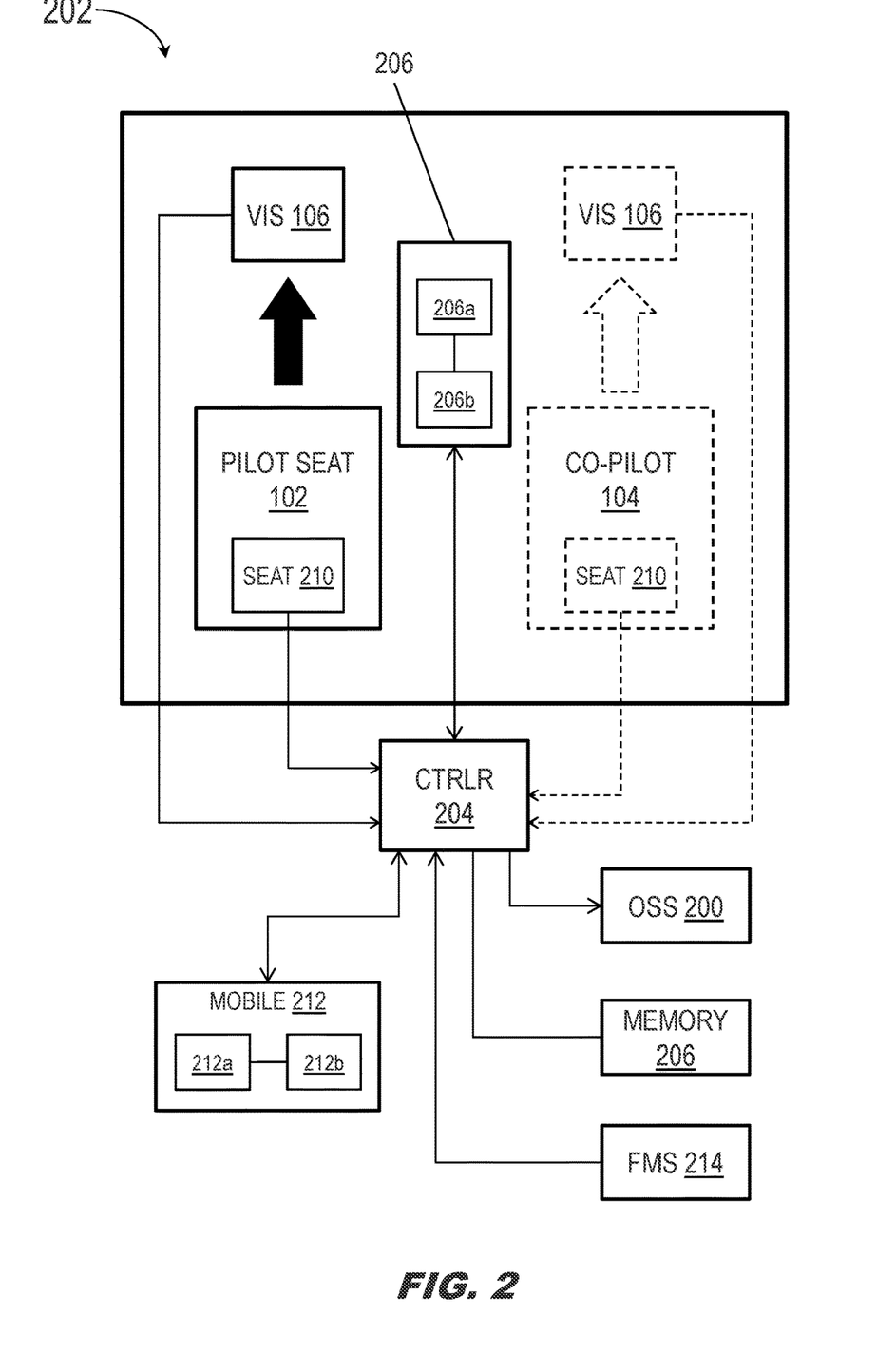
FIG. 2 is a block diagram illustrating an operator safety system (OSS: e.g., pilot safety system (PSS)) according to example embodiments of this disclosure.

Referring to FIG. 2, the OSS 200 is disclosed. The OSS 200 may include a smart engagement/disengagement system 202 comprising a controller 204, interface 206, memory 208, and seat-based presence sensors 210.

In embodiments, the smart engagement/disengagement system 202 may determine whether an operator of a vehicle (e.g., an operator monitored by the OSS 200) is present in the control space 100. If the presence or non-presence of the pilot or co-pilot is inconsistent with the current engagement status of the OSS 200, the OSS may prompt the pilot or co-pilot to manually adjust the engagement status of the OSS to align with their presence or non-presence in the control space 100. For example, if the control space 100 is an aircraft cockpit, the smart engagement/disengagement system 202 may continually determine (e.g., at a predetermined time interval) whether the pilot is present in the pilot seat 102 and/or whether the co-pilot is present in the co-pilot seat 104.

In embodiments, the smart engagement/disengagement system 202 may be accessible via the interface 206, including a display 206a for presenting information related to the OSS (e.g., alerts, data, engagement status) and an input device 206b for accepting control input from the pilot. For example, the interface 206 may be embodied in a touchscreen surface (e.g., a fixed cockpit display or a mobile computing device in wired or wireless communication with the OSS 200). For example, when the smart engagement/disengagement system 202 determines that the presence or non-presence of the pilot is inconsistent with the engagement status of the OSS 200, the display 206a may present a notification requesting the pilot disengage or re-engage the OSS, e.g., via a single-touch engagement with the input device 206b. Alternatively, or additionally, the controller 204 may prompt the pilot via a mobile device 212 (e.g., a smartphone or other like portable computing or communications device) carried on the pilot's person and in wireless communication with the OSS 200. For example, if the pilot has left the control space 100, the pilot may still be prompted (e.g., via display 212a) to disengage (e.g., via mobile device input 212b) the OSS.

In embodiments, if the smart engagement/disengagement system 202 determines the pilot to be not present, e.g., not seated in the pilot seat 102, and the OSS 200 is still engaged, the controller 204 may prompt the pilot to disengage the OSS. For example, if the pilot has left the pilot seat 102 but has not yet left the control space 100, the controller 204 may prompt the pilot to disengage the OSS 200 before leaving. Similarly, if the smart engagement/disengagement system 202 determines the pilot to be present, e.g., having returned to the pilot seat 102, and the OSS 200 is still disengaged, the controller 204 may similarly prompt the pilot to re-engage the OSS.

In embodiments, the smart engagement/disengagement system 202 may determine the presence or non-presence of the pilot or co-pilot via one or more presence sensors, e.g., including (but not limited to) visual presence sensors 106 and/or seat-based presence sensors 210. For example, the visual presence sensors 106 may include a camera or other like image sensor configured to capture image data for analysis by the controller 204. In embodiments, the visual presence sensors 106 may be oriented toward the pilot seat 102 (e.g., or co-pilot seat 104) with an unobstructed view of the pilot seat/co-pilot seat (or, e.g., the pilot or co-pilot, when present in either seat).

In embodiments, the controller 204 may include one or more processors configured to analyze image data captured by the visual presence sensors 106 to determine (e.g., to a sufficient level of confidence) whether the pilot is present or not present in the pilot seat 102 (or, e.g., the co-pilot within the co-pilot seat). For example, the controller 204 may perform a coarse analysis of the image data, e.g., to determine whether or not the image data portray an empty pilot seat 102 or an occupied pilot seat, whether the image data indicate movement from frame to frame, and/or whether the image data indicate contrast with the pilot seat itself (e.g., a dark mass contrasting with a light-colored pilot seat, indicative of a uniformed pilot occupying the pilot seat). Alternatively, or additionally, the controller 204 may perform a fine analysis of the image data to determine not merely whether the pilot seat 102/co-pilot seat 104 is occupied or not, but whether an occupied pilot seat is occupied by a uniformed pilot, by a specific pilot-in-command or co-pilot authorized for access to the control space 100, or by an individual not authorized for access to the control space. For example, the controller may compare the image data to reference images of uniformed pilots (e.g., which may include the authorized pilot, co-pilot, or other cockpit crew members) to more positively identify an occupant of the pilot seat 102 or co-pilot seat 104.

In embodiments, the seat-based presence sensors 210 may be disposed or embedded within the pilot seat 102 and/or co-pilot seat 104 and may be configured to detect whether the said seat is currently occupied or not occupied (equivalent to a determination of a pilot/co-pilot as present-not present). For example, the seat-based presence sensors 210 may detect changes in pressure and/or temperature within the pilot seat 102/co-pilot seat 104 and thereby determine, to a level of confidence, that the said pilot seat/co-pilot seat currently has a human occupant, informing the controller 204 that the said pilot seat/co-pilot seat is currently occupied or not occupied.

In embodiments, the smart engagement/disengagement system 202 may be in communication with a vehicle management system (e.g., flight management system 214 (FMS; e.g., flight control system)) of the vehicle or aircraft. For example, above and beyond periodic checks for pilot/co-pilot presence/non-presence, the FMS 214 may initiate a detection of the pilot/co-pilot in response to one or more triggering events; e.g., an inflight emergency or multiple unsuccessful attempts to contact the pilot on the part of air traffic control (ATC).

Figure 3:
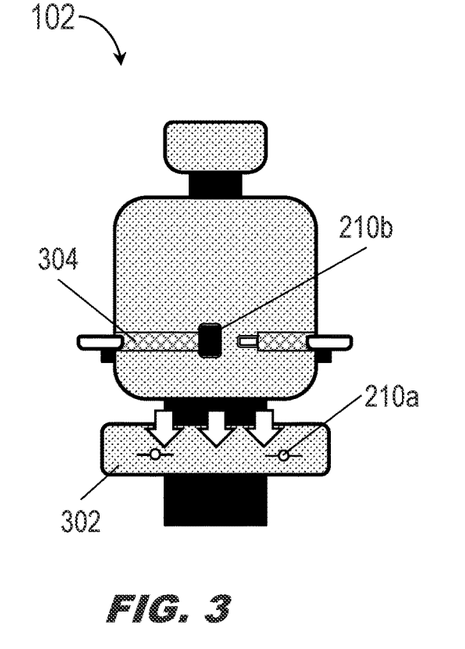
FIG. 3 is an illustration of an operator seat incorporating presence sensors of the OSS of FIG. 2.

Referring now to FIG. 3, the pilot seat 102 is shown. In embodiments, the co-pilot seat (104, FIG. 2) may be implemented similarly to the pilot seats 102 shown by FIGS. 3, 4A, 4B, and 5.

In embodiments, the pilot seat 102 may incorporate multiple seat-based presence sensors (210, FIG. 2) operating independently of each other and reporting to the controller (204, FIG. 2). For example, the pilot seat 102 may incorporate seat-based pressure sensors 210a embedded within a seat cushion 302 of the pilot seat (or within a seatpan or seat frame component). In embodiments, the seat-based pressure sensors 210a may register the pressure or weight of a human occupant of the pilot seat 102 (e.g., seated upon the seat cushion 302) and may accordingly determine (and register with the controller 204) that an operator is present in the pilot seat. Similarly, if normal pressure or weight is detected by the seat-based pressure sensors 210a (e.g., consistent with an empty seat), the seat-based pressure sensors may determine and register that an operator is not present.

In some embodiments, seat-based presence sensors 210 may include a harness sensor 210b disposed or embedded within a seatbelt 304 (e.g., within a buckle) or safety harness configured for securing the operator to the pilot seat 102, the harness sensor capable of determining whether the seatbelt/harness is fastened or unfastened. For example, the seatbelt 304 may be fastened or unfastened; if the seatbelt is unfastened, the harness sensor 210b may determine and register that the operator is not present. Similarly, if the seatbelt 304 is fastened, the harness sensor 210b may determine and report that the operator is present.

Figure 4A:
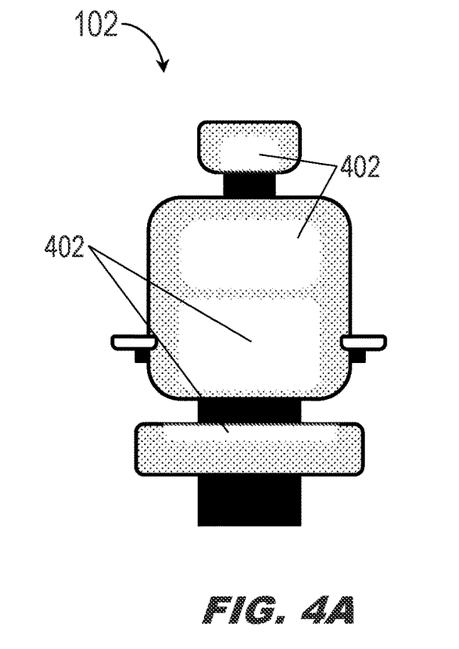
FIGS. 4A and 4B are illustrations of thermal presence sensors of the OSS of FIG. 2.
Figure 4B:
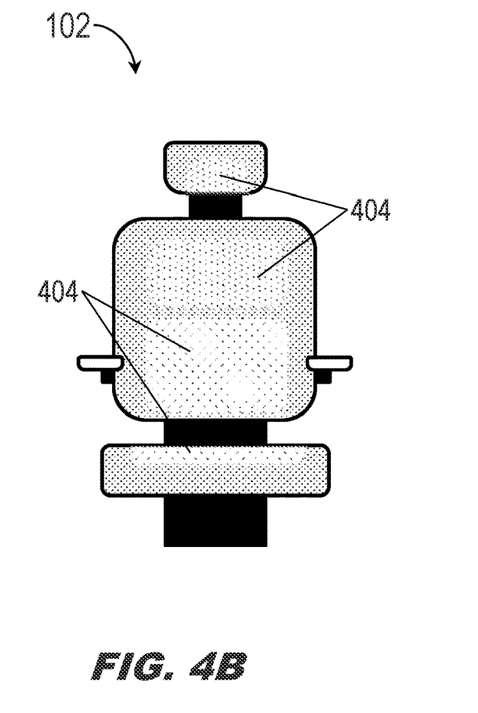

Referring now to FIGS. 4A and 4B, in embodiments the visual presence sensors (106, FIG. 2) may include image sensors or cameras operating in non-visible spectra (e.g., forward-looking infrared (FLIR) sensors). For example, the visual presence sensors 106 may include thermal imagers oriented at the pilot seat 102. Thermal imagers may detect temperature readings or heat signatures 402 associated with the pilot seat 102 indicative of the body heat of a human occupant, and may therefore determine and register that an operator is present in the pilot seat. Similarly, if the thermal imagers fail to detect sufficient heat to indicate a current human occupant, the visual presence sensors 106 may determine and register that an operator is not present.

The visual presence sensors 106 may include thermal imagers capable (in collaboration with the controller 204) of detecting additional information associated with a non-present operator in the pilot seat 102. In embodiments, referring in particular to FIG. 4B, the thermal imagers may detect residual heat signatures 404 associated with the pilot seat. While the residual heat signatures 404 may not be indicative of a current human occupant, the controller 204 may infer, based on the heat levels detected and reported by the thermal imagers, not only that an operator is not currently present in the pilot seat 102, but the duration since the operator left the pilot seat. For example, based on the inferred duration, the controller 204 may determine whether to prompt the operator to disengage the OSS (200, FIG. 2) via the interface (206, FIG. 2) or via mobile device (212, FIG. 2), e.g., if the duration suggests the operator may have left the control space (100, FIG. 1).

Figure 5:
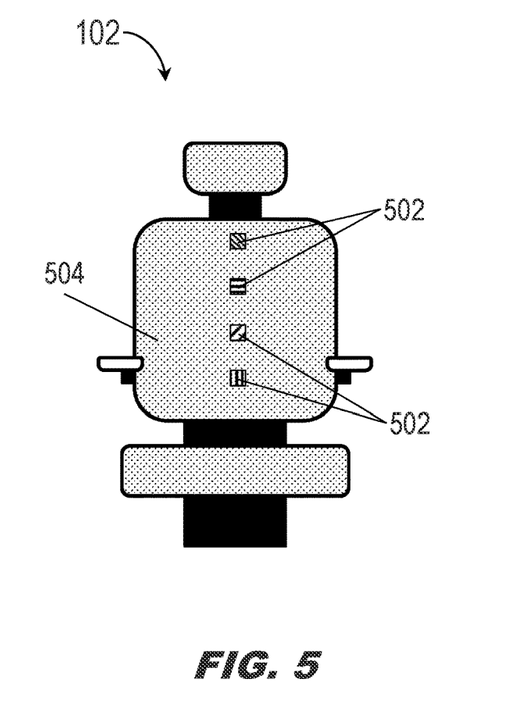
FIG. 5 is an illustration of an operator seat incorporating encoded markers compatible with the OSS of FIG. 2.

Referring in particular to FIG. 5, the pilot seat 102 may incorporate encoded fiducials 502 set into the upholstery of the seatback 504 and/or seat cushion 302 and oriented toward the visual presence sensors 106. In embodiments, the visual presence sensors 106 may determine whether an operator is present in the pilot seat 102 based on an ability or inability to detect and decode the encoded fiducials 502. For example, if the encoded fiducials 502 are detected and decoded by the visual presence sensors 106, the controller 204 may determine that an operator is not present in the pilot seat 102. Similarly, if the visual presence sensors 106 are unable to detect the encoded fiducials 502, the controller 204 may infer that an operator is present.

Figure 6A:
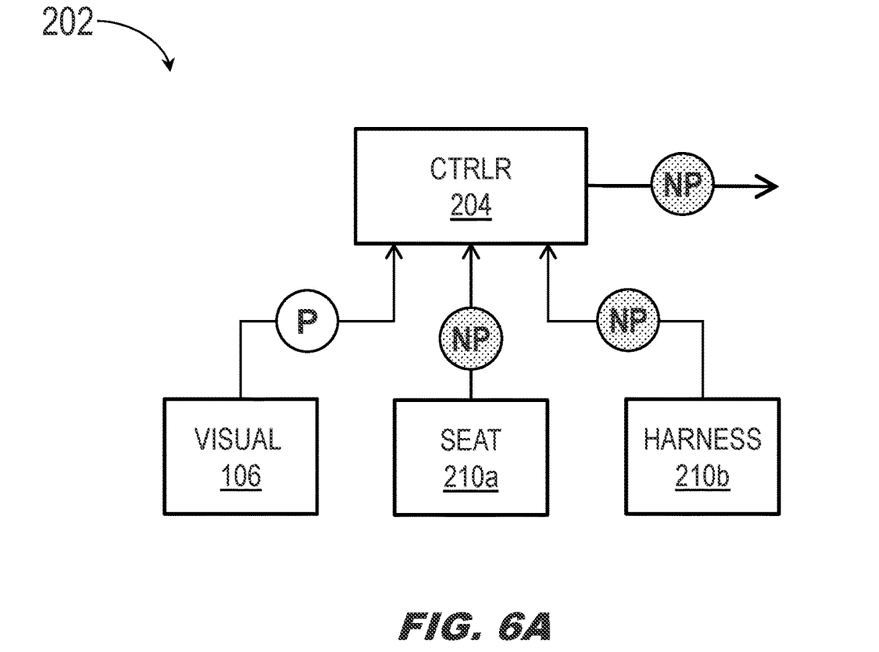
FIGS. 6A and 6B are block diagrams illustrating the OSS of FIG. 2 incorporating multiple deconflicting presence sensors.

Referring to FIG. 6A, the smart engagement/disengagement system 202 is shown.

In embodiments, the smart engagement/disengagement system 202 may incorporate multiple and diverse presence sensors operating independently of each other to determine whether an operator or pilot is present or not present in the pilot seat/co-pilot seat (102/104, FIG. 2). For example, the controller 204 may receive determinations of presence or non-presence registered by visual presence sensors 106 (e.g., camera), seat-based pressure sensors 210a, and harness sensor 210b.

In some embodiments, the determinations received by the controller 204 may contradict each other. For example, the seat-based pressure sensors 210a and harness sensor 210b may both register non-presence (NP). However, the visual presence sensors 106 may detect movement (e.g., behind or in front of the pilot seat 102, indicative of an operator who may not be in the pilot seat but may remain within the control space (100, FIG. 1) and may therefore register a determination that an operator is present (P).

In some embodiments, the controller 204 may resolve conflicting determinations of presence or non-presence by three or more sensors via a simple majority "vote" of registering sensors. For example, if two sensors (210a, 210b) register non-presence (NP), and one sensor (106) registers presence (P), the visual presence sensor 106 may be outvoted and the controller 204 may determine that the operator is not present (NP).

Figure 6B:
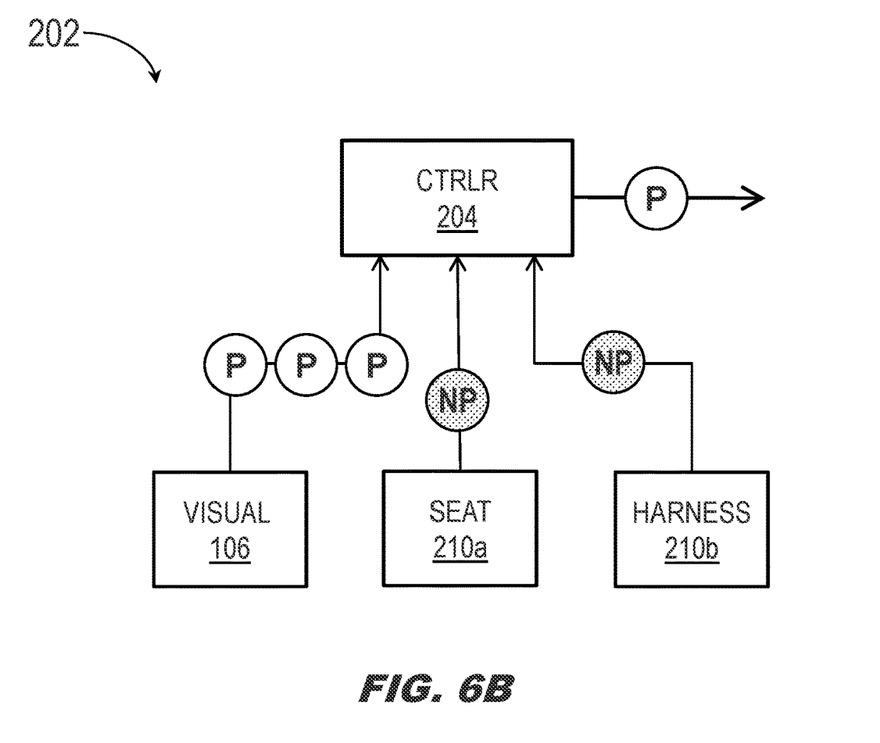

In some embodiments, referring in particular to FIG. 6B, the controller 204 may resolve conflicting determinations from two or more sensors by assigning a weight to each registering sensor. For example, the controller 204 may assign a weight of 3 (PPP) to the visual presence sensor 106 and a weight of 1 (NP) to the seat-based pressure sensor 210a and harness sensor 210b, such that a scenario similar to that shown by FIG. 6A (visual presence sensor 106 registers presence P, seat-based pressure sensors 210a and harness sensor 210b register non-presence NP), is instead interpreted by the controller as a determination of presence (P) due to the greater weight assigned to the visual presence sensor.

Figure 7:
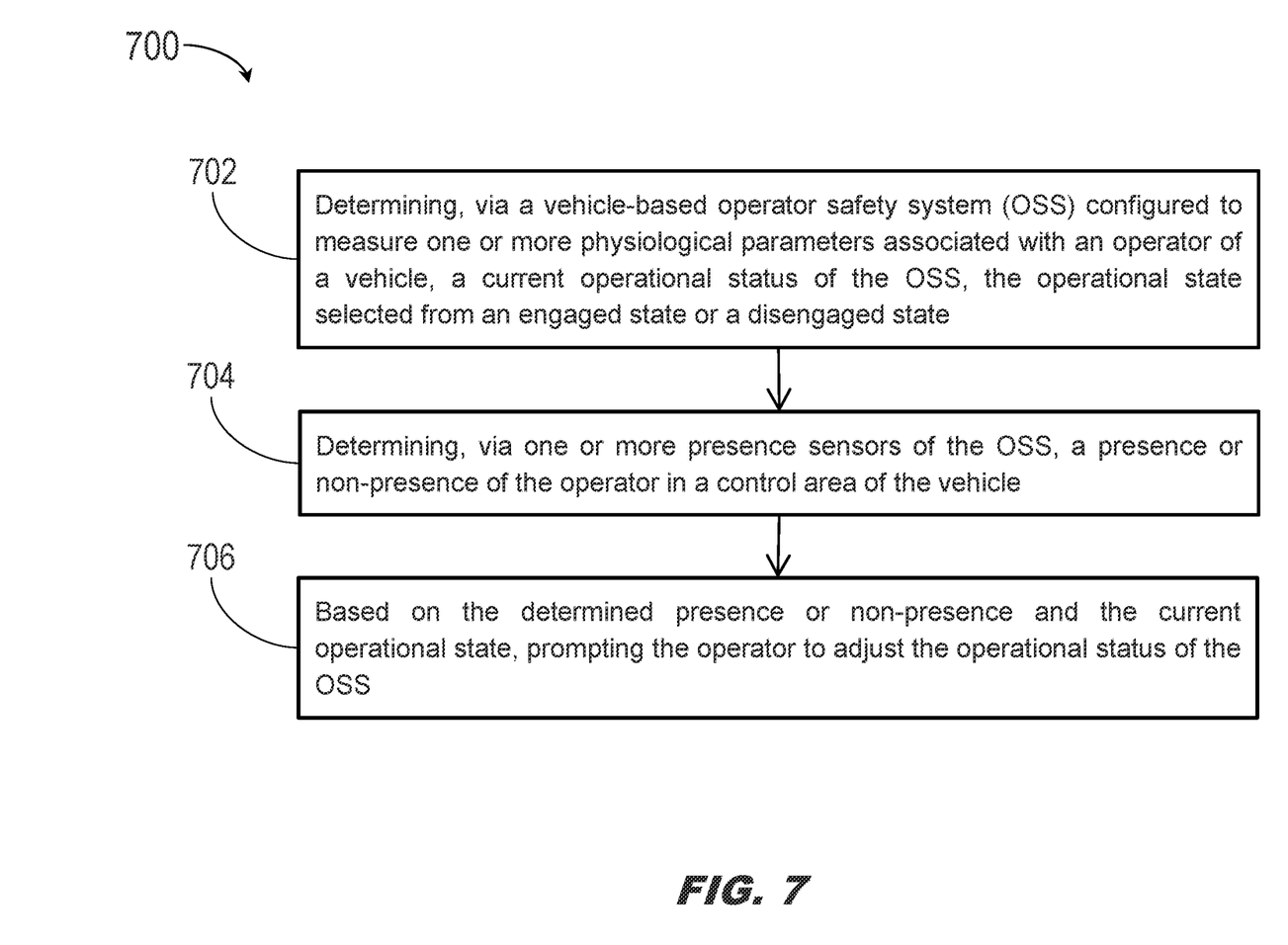
FIG. 7 is a process flow diagram illustrating a method for smart monitoring of a vehicle operator according to example embodiments of this disclosure.

Referring to FIG. 7, the method 700 may be implemented by the OSS 200 and smart engagement/disengagement system 202 within a vehicle and may incorporate the following steps.

At a step 702, the OSS determines its operational state as engaged or disengaged, e.g., monitoring or not monitoring a pilot or co-pilot.

At a step 704, one or more presence sensors of the OSS determine a presence of non-presence of an operator in a control area of the vehicle, and register the determination of presence or non-presence with the smart engagement/disengagement system. For example, visual presence sensors may determine whether a pilot or co-pilot is seated in a pilot seat/co-pilot seat within an aircraft cockpit. Similarly, seat-based sensors may determine whether the operator is present or not present in the pilot seat/co-pilot seat.

At a step 706, based on the registered determinations of presence or non-presence and the current operational state of the OSS, the OSS may prompt the operator to engage or disengage the OSS. For example, if the operator is present and the OSS is disengaged, the OSS will prompt the operator to re-engage; similarly, if the operator is not present and the OSS is engaged, the OSS will prompt the pilot (directly or remotely) to disengage the OSS. If multiple sensors register presence or non-presence, the OSS will resolve any conflicting determinations via majority vote of the registering sensors, or via assigning different weights or priorities to different sensors.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An operator safety system (OSS) for a vehicle, comprising:
   one or more presence sensors configured for installation in a control area of a vehicle, the one or more presence sensors configured to determine a presence or non-presence of the operator in the control area;
   and
   an operator interface comprising:
      at least one display surface configured to present information to the operator;
      and
      at least one input device configured to accept manual control input from the operator, wherein the manual control input includes a command to manually engage and disengage the OSS;
   the OSS having an operational state selected from engaged or disengaged, the operator capable of manually transitioning the OSS between the engaged and disengaged states via the input device;
   the OSS configured:
      when the one or more presence sensors determine the operator is not present in the control area and the OSS state is engaged, to prompt the operator to manually disengage the OSS via the input device;
      and
      when the one or more presence sensors determine the operator is present in the control area and the OSS state is disengaged, to prompt the operator to manually engage the OSS via the input device.

2. The operator safety system of claim 1, wherein:
   the display surface and the input device are embodied in at least one touch-sensitive display screen;
   and wherein
   the input device is configured to allow the operator to engage or disengage the OSS via a single touch.

3. The operator safety system of claim 1, wherein the one or more presence sensors include at least one of a camera or an image sensor.

4. The operator safety system of claim 3, wherein:
   the one or more presence sensors are configured for thermal imaging of one or more of the operator or the control area;
   and
   wherein the OSS is configured to:
      detect a heat level associated with the control area based on the thermal imaging;
      and
      determine a presence or non-presence of the operator based on the detected heat level.

5. The operator safety system of claim 4, wherein the OSS is configured to determine, based on the detected heat level:
   a non-presence of the operator;
   and
   a duration associated with the non-presence of the operator.

6. The operator safety system of claim 3, wherein:
   the one or more presence sensors are configured to detect encoded information associated with the control area;
   and wherein
   the OSS is configured to determine a presence or non-presence of the operator based on the detection of the encoded information.

7. The operator safety system of claim 1, wherein:
   the vehicle is an aircraft;
   the operator is a pilot or a co-pilot of the aircraft;
   the control area includes a pilot seat;
   and
   the at least one presence sensor is configured to determine whether the operator is seated in a pilot seat.

8. The operator safety system of claim 7, wherein:
   the one or more presence sensors are disposed within the pilot seat;
   and wherein
   the OSS is configured to determine whether the operator is seated in the pilot seat via at least one of a detected temperature or a detected pressure associated with the pilot seat.

9. The operator safety system of claim 7, wherein:
   the one or more presence sensors are in communication with at least one of a safety belt or a safety harness configured to secure the operator to the pilot seat, the safety belt or safety harness having a fastened state and an unfastened state detectable by the one or more presence sensors;
   and wherein
   the OSS is configured to determine a presence or non-presence of the operator based on the fastened or unfastened state.

10. The operator safety system of claim 1, wherein the OSS is configured to prompt the operator via a mobile device wirelessly linked to the OSS, the mobile device carried by the operator.

11. The operator safety system of claim 1, wherein the OSS is configured to periodically determine the presence or non-presence of the operator in the control area at a predetermined time interval.

12. The operator safety system of claim 1, wherein:
   the OSS is in communication with a vehicle management system;
   and
   the OSS is configured to determine the presence or non-presence of the operator in response to a triggering event received from the vehicle management system.

13. The operator safety system of claim 1, wherein:
   the one or more presence sensors include at least two independent presence sensors, each independent presence sensor configured to register a decision that the operator is present or non-present;
   and wherein
   the OSS is configured to determine the presence or non-presence of the operator based on a majority of the one or more registered decisions.

14. The operator safety system of claim 13, wherein the OSS is configured to:

assign a weight to each registered decision;
and
determine the presence of non-presence of the operator based on a weighted majority of the one or more registered decisions.

15. A method for smart monitoring of a vehicle operator, the method comprising:
determining, via a vehicle-based operator safety system (OSS) configured to measure one or more physiological parameters associated with an operator of a vehicle, a current operational state of the OSS, the operational state selected from an engaged state or a disengaged state;
determining, via one or more presence sensors of the OSS, the one or more presence sensors configured for installation within a control area of the vehicle, a presence or non-presence of the operator in the control area;
based on a determined presence of the operator in the control area and a current disengaged operational state of the OSS, prompting the operator to manually engage the OSS via an operator interface;
and
based on a determined non-presence of the operator in the control area and a current engaged operational state of the OSS, prompting the operator to manually disengage the OSS via the operator interface.

16. The method of claim 15, wherein determining, via one or more presence sensors of the OSS, a presence or non-presence of the operator in a control area of the vehicle includes:
independently assessing, via at least two independent presence sensors of the OSS, a presence or non-presence of the operator;
registering with a controller of the OSS a presence or non-presence of the operator independently assessed by each independent presence sensor;
and
determining, via the controller, the presence or non-presence based on a majority of registered assessments received from the at least two independent presence sensors.

17. The method of claim 16, wherein determining, via one or more presence sensors of the OSS, a presence or non-presence of the operator in a control area of the vehicle includes:
assigning, via the controller, a weight to each independent presence sensor;
and wherein
determining, via the controller, the presence or non-presence based on a majority of registered assessments received from the at least two independent presence sensors includes determining the presence or non-presence based on a majority of weighted registered assessments.

18. The method of claim 15, wherein the control area includes a pilot seat, and wherein determining, via one or more presence sensors of the OSS, the one or more presence sensors configured for installation within a control area of the vehicle, a presence or non-presence of the operator in the control area includes:
determining, via the one or more presence sensors, whether the operator is seated in the pilot seat.

19. The method of claim 18, wherein the one or more presence sensors include one or more presence sensors disposed within the pilot seat, and:
wherein determining, via the one or more presence sensors, whether the operator is seated in the pilot seat includes:
determining, via the one or more presence sensors, whether the operator is seated in the pilot seat based on at least one of a detected temperature or a detected pressure associated with the pilot seat.

20. The method of claim 18, wherein the one or more presence sensors are in communication with at least one of a safety belt or a safety harness configured to secure the operator to the pilot seat, the safety belt or safety harness having a fastened state and an unfastened state detectable by the one or more presence sensors, and:
wherein determining, via the one or more presence sensors, whether the operator is seated in the pilot seat includes:
determining, via the one or more presence sensors, whether the operator is seated in the pilot seat based on the fastened or unfastened state of the safety belt or safety harness.

\* \* \* \* \*